United States Patent [19]

Horikawa et al.

[11] Patent Number: 5,218,023

[45] Date of Patent: Jun. 8, 1993

[54] RUBBER COMPOSITION AND PROCESS FOR PREPARING SAME

[75] Inventors: Hiroyoshi Horikawa; Shuichi Akita, both of Yokohama; Hiroyuki Watanabe, Oiso, all of Japan

[73] Assignee: Nippon Zeon Co., Ltd., Tokyo, Japan

[21] Appl. No.: 677,186

[22] Filed: Mar. 29, 1991

[30] Foreign Application Priority Data

Mar. 30, 1990 [JP] Japan ................................. 2-83244

[51] Int. Cl.$^5$ ................................. C08K 5/21
[52] U.S. Cl. ................................. 524/210; 524/211; 524/230; 524/232; 524/236; 524/241
[58] Field of Search ............... 524/210, 230, 232, 236, 524/241

[56] References Cited

U.S. PATENT DOCUMENTS 4,647,625 3/1987 Aonuma et al. .................... 525/232

*Primary Examiner*—Paul R. Michl
*Assistant Examiner*—Edward Cain
*Attorney, Agent, or Firm*—Armstrong, Westerman, Hattori, McLeland & Naughton

[57] ABSTRACT

A rubber composition comprising a rubbery polymer, carbon black and a processing aid is described wherein the processing aid is a liquid diene polymer having a weight average molecular weight of about 5,000 to 140,000 and having an atomic group having a bond represented by the formula:

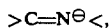

which is bonded to the terminal of the polymer chain, and the amount of the liquid diene polymer is 1 to 100 parts by weight per 100 parts by weight of the rubbery polymer. The liquid diene polymer is usually prepared by reacting an anionic living liquid diene polymer with a compound having in the molecule a bond represented by the formula:

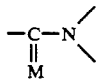

in which M represents an oxygen or sulfur atom.

3 Claims, No Drawings

1

RUBBER COMPOSITION AND PROCESS FOR PREPARING SAME

BACKGROUND OF THE INVENTION

1. Field of the Invention

This invention relates to a carbon black-incorporated rubber composition having an enhanced processability and giving a vulcanizate having a satisfactory strength and rebound, and a process for the preparation of this composition.

2. Description of the Related Art

The processability of a carbon black-incorporated rubber composition and the hardness, tensile strength and rebound of the vulcanizate thereof are greatly influenced by the state of dispersion of carbon black.

The addition of a processing aid such as a process oil or a liquid rubber to a rubber composition has heretofore been adopted as the means for improving the processability of the carbon black-incorporated rubber composition. However, the addition of such a processing aid results in degradation of the physical properties of the rubber, such as the rebound.

As the means for improving the dispersibility of carbon black in a rubber composition, there has been proposed a polymer modifying process, for example, a process in which active terminals of a diene polymer are modified with a terminal modifier such as a tin halide compound, an isocyanate compound or a benzophenone derivative (see, for example, U.S. Pat. Nos. 4,550,142 and 4,647,625), Japanese Unexamined Patent Publication No. 61-141741 and Japanese Unexamined Patent Publication No. 61-293205).

However, when carbon black is incorporated with a modifier rubber as mentioned above, the Mooney viscosity of the compound stock becomes very high and the processability thereof becomes poor. It is eagerly desired to overcome this defect.

SUMMARY OF THE INVENTION

It is therefore a primary object of the present invention to provide a carbon black-incorporated rubber composition giving a compound stock exhibiting a good processability and giving a vulcanizate having physical properties, such as rebound and tensile strength, maintained at high levels.

Another object of the present invention is to provide a process for the preparation of this carbon black-incorporated rubber composition.

In accordance with one aspect of the present invention, there is provided a rubber composition comprising a rubbery polymer, carbon black and a processing aid, wherein the processing aid is a liquid diene polymer having a weight average molecular weight of about 5,000 to 140,000 and having an atomic group having a bond represented by the formula:

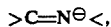

which is bonded to the terminal of the polymer chain, and the amount of the liquid diene polymer is 1 to 100 parts by weight per 100 parts by weight of the rubbery polymer.

In accordance with another aspect of the present invention, there is provided a process for the preparation of the above-mentioned rubber composition, which comprises mixing together a rubbery polymer and carbon black with the above-mentioned liquid diene polymer.

DESCRIPTION OF THE PREFERRED EMBODIMENTS

Any rubbery polymers capable of being reinforced by incorporation of carbon black, such as a diene polymer, a natural rubber and an ethylene/propylene/diene monomer terpolymer rubber (EPDM), can be used as the rubbery polymer in the present invention. As the diene polymer, there can be mentioned homopolymers and copolymers of at least one monomer selected from conjugated dienes such as 1,3-butadiene, isoprene, 2,3-dimethylbutadiene, 1,3-pentadiene and chroloprene, and copolymer rubbers of these conjugated dienes with monomers copolymerizable therewith, for example, aromatic vinyl compounds such as styrene, α-methylstyrene and vinyltoluene, unsaturated nitriles such as acrylonitrile and methacrylonitrile, unsaturated carboxylic acids such as acrylic acid, methacrylic acid, maleic acid, itaconic acid and fumaric acid, and unsaturated carboxylic acid esters such as methyl acrylate, methyl methacrylate, ethyl acrylate, ethyl methacrylate, butyl acrylate, methoxymethyl acrylate, and methoxyethyl acrylate. More specifically, polybutadiene, polyisoprene, a butadiene/isoprene copolymer, a styrene/butadiene copolymer rubber, a styrene/isoprene copolymer rubber and an acrylonitrile/butadiene copolymer rubber can be mentioned.

The processing aid used in the present invention is a liquid diene polymer having an atomic group having a bond represented by the formula:

which is bonded to the terminal of the polymer chain. This atomic group can be introduced in the polymer molecule according to the process disclosed in U.S. Pat. No. 4,647,625.

Namely, an anionic living liquid diene polymer obtained by polymerizing, e.g., a conjugated diene in the presence of a catalyst containing an alkali metal and/or an alkaline earth metal as the base component is reacted with a compound as mentioned below, and a proton-donating substance such as water or an alcohol is added to the reaction mixture to yield a liquid polymer having a weight average molecular weight of about 5,000 to 140,000.

As the compound to be reacted with the living liquid diene polymer, there can be mentioned N-substituted lactams such as N-methyl-β-propiolactam, N-t-butyl-β-propiolactam, N-methoxyphenyl-β-propiolactam, N-naphthyl-β-propiolactam, N-methyl-2-pyrrolidone, N-phenyl-2-pyrrolidone, N-methoxyphenyl-2-pyrrolidone, N-vinyl-2-pyrrolidone, N-benzyl-2-pyrrolidone, N-naphthyl-2-pyrrolidone, N-methyl-5-methyl-2-pyrrolidone, N-t-butyl-5-methyl-2-pyrrolidone, N-phenyl-5-methyl-2-pyrrolidone, N-methyl-3,3'-dimethyl-2-pyrrolidone, N-t-butyl-3,3'-dimethyl-2-pyrrolidone, N-phenyl-3,3'-dimethyl-2-pyrrolidone, N-methyl-2-piperidone, N-t-butyl-2-piperidone, N-phenyl-2-piperidone, N-methoxyphenyl-2-piperidone, N-vinyl-2-piperidone, N-benzyl-2-piperidone, N-naphthyl-2-piperidone, N-methyl-3,3'-dimethyl-2-piperidone, N-phenyl-3,3'-dimethyl-2-piperidone, N-methyl-ε-caprolactam, N-phenyl-ε-caprolactam, N-methoxyphenyl-ε-caprolactam, N-vinyl-ε-caprolactam, N-benzyl-ε-caprolactam, N-naphthyl-ε-caprolactam, N-methyl-ω-laurylolactam, N-phenyl-ω-laurylolactam, N-t-butyl-ω-laurylolactam, N-vinyl-ω-laurylolactam and N-benzyl-ω-laurylolactam, and N-substituted thiolactams corresponding to these N-substituted lactams; and N-substituted cyclic ureas such as 1,3-dimethyl-2-imidazolidinone, 1,3-diethyl-2-imidazolidinone, 1-methyl-3-ethyl-2-imidazolidinone, 1,3-dimethylethylene urea, 1,3-diphenylethylene urea, 1,3-di-tbutylethylene urea and 1,3-divinylethylene urea, and N-substituted cyclic thioureas corresponding to these N-substituted cyclic ureas. These compounds have in the molecule a bond represented by the formula:

in which M is an oxygen or sulfur atom.

The compound to be reacted with the living liquid diene polymer further includes N-substituted aminoaldehydes such as 3-dimethylaminopropionaldehyde and 4-dimethylaminobenzaldehyde, N-substituted aminoketones such as 4-dimethylaminoacetophenone and 4,4'-bis(dimethylamino)-benzophenone, and N-substituted aminothioaldehydes and N-substituted aminothioketones corresponding to these N-substituted aminoaldehydes and N-substituted aminoketones, respectively.

The liquid diene polymer is a homopolymer or copolymer prepared from at least one conjugated diene monomer and an optional copolymerizable monomer. The diene monomer and the copolymerizable monomer are selected from those which are mentioned above with regard to the preparation of the diene polymer rubber. Thus, the liquid diene polymer may be similar to the above-mentioned diene polymer rubber except for the molecular weight.

The liquid diene polymer having the above-mentioned atomic group bonded to the terminal of the molecule chain has a weight average molecular weight of about 5,000 to 140,000. If the weight average molecular weight is outside this range, the processability of the rubber composition or physical properties of the rubber is degraded.

The kind and amount of carbon black to be incorporated with the rubbery polymer for the preparation of the rubber composition of the present invention are not particularly limited and are determined according to the intended use of the rubber composition.

Carbon black of various grades, such as FEF, GPF, HAF, ISAF, MAF, and IISAF, can be used in the present invention. Generally, the amount of the carbon black used is about 10 to 100 parts by weight per 100 parts by weight of the rubbery polymer.

The amount of the processing aid in the rubber composition of the present invention is about 1 to 100 parts by weight, preferably about 2 to 80 parts by weight, per 100 parts by weight of the rubbery polymer. If the amount of the processing aid is too small, the dispersibility of carbon black is improved only to a negligible extent, and if the amount of the processing aid is too large, when other additives are incorporated, the adaptability to the rolling operation becomes poor. An optimum amount is determined within the above range according to the intended use of the rubber composition of the present invention.

The rubber composition of the present invention is prepared by using an ordinary mixer such as a roll mill, a Banbury mixer or an internal mixer. The order of addition of the respective ingredients is not particularly limited, but preferably a method is adopted in which a part of the rubbery polymer is mixed with the entire amount of the processing aid, the mixture is mixed with the entire amount of carbon black, and the resulting mixture is mixed with the remainder of the rubbery polymer. By adopting this method, the dispersibility of carbon black is further improved and the physical properties of the vulcanizate are further improved.

The rubber composition of the present invention has a good processability and the amount of a process oil added can be reduced, but, if desired, an aromatic, naphthenic or paraffinic process oil can be incorporated in the rubber composition of the present invention.

When the rubber composition of the present invention is used as a rubber compound stock, various additives customarily used in the rubber industry, such as a sulfur vulcanizing system comprising sulfur, zinc oxide, stearic acid and a vulcanization accelerator (e.g., guanidine, thiazole, thiuram or a dithio-acid salt accelerator) or an organic peroxide vulcanization system, a process oil, a plasticizer, another processing aid and an antioxidant, can be incorporated according to need.

The present invention will now be described in detail with reference to the following examples.

In the examples, the weight average molecular weight of the rubbery polymer was determined by gel permeation chromatography (GPC). GPC was carried out at a temperature of 38° C. and a flow rate of 1.2 ml/min by using two columns (GMH-6 supplied by Tosoh Corp.), and the molecular weight was calibrated by using the known weight average molecular weight of standard polystyrene.

EXAMPLES 1 THROUGH 3

A stainless steel polymerization reactor having an inner capacity of 2 liters was washed and dried, the inner atmosphere of the reactor was replaced by dry nitrogen, and then, the reactor was charged with 112.5 g of 1,3-butadiene, 37.5 g of styrene, 820 g of benzene, 0.75 g of tetrahydrofuran and 30 millimoles of n-butyl lithium (dissolved in n-hexane). The polymerization was carried out at 45° C. for 2 hours while stirring the content. After termination the polymerization reaction, 250 millimoles of a modifier compound shown in Table 1 was incorporated and the addition reaction was carried out for 30 minutes. Then 5 ml of methanol was added to stop the reaction. Then 15 ml of a 10% 6-di-t-butyl-p-cresol solution in methanol was added to the polymer solution. The thus-prepared polymer solution was vacuum-dried at 50° C. under 10 mmHg by using an evaporator to evaporate the volatile component mainly comprised of benzene in the solution, whereby a liquid diene polymer rubber was obtained. The obtained polymer rubber was a liquid having a weight average molecular weight of 6,000 and a good flowability at room temperature. To 10 g of the liquid diene polymer rubber were added 100 g of styrene/butadiene copolymer rubber (SBR) (Nipol 1502 supplied by Nippon Zeon Co.), 50 g of ISAF carbon black (Seast KH supplied by Tokai Carbon), 3 g of zinc oxide No. 1, 2 g of stearic acid, 1.75 g of sulfur, 5 g of aromatic process oil and 1.1 g of N-cyclohexyl-2-benzothiazole sulfenamide, and the resulting rubber composition was kneaded by using rolls. At the kneading step, at first, 50 g of the SBR was kneaded with 10 g of the liquid diene polymer rubber and 50 g of the carbon black by using the rolls, 50 g of the SBR was then added and kneaded.

By using a part of the thus-prepared rubber composition, the extrusion processability was evaluated according to the method of ASTM D-2230-78, and expressed in terms of the total points of four items, i.e., the surface smoothness, the sharpness of 30° edge continuity, the state of formation of foams and the edge sharpness and continuity of angles other than 30°. The results are shown in Table 1. The remainder of the rubber composition was press-vulcanized at 160° C. for 25 minutes to obtain a test piece, and the rebound at 60° C. and the wet skid resistance were measured.

The test piece was allowed to stand in an atmosphere maintained at 60° C. and the rebound at 60° C. was measured according to JIS K-6301. The wet skid resistance was measured at 23° C. on the surface of a road of ASTM E-303-74 (outdoor type B supplied by 3M, black safety walk) by using a portable skid tester (Stanley Co., United Kingdom). The results are shown in Table 1.

Note, the amounts occurring in Table 1 are parts by weight per 100 parts by weight of SBR unless otherwise indicated, in not only the present example but also the subsequent examples.

TABLE 1

| Example No. | Example 1 | Example 2 | Example 3 |
|---|---|---|---|
| Modifier | A | B | C |
| Weight average molecular weight of liquid diene polymer rubber | 6000 | 6000 | 6000 |
| Amount of liquid diene polymer rubber | 10 | 10 | 10 |
| Rebound at 60° C. | 61 | 62 | 59 |
| Wet skid resistance | 62 | 63 | 61 |
| Extrusion processability | 15 | 16 | 16 |

Note
A: N-methyl-2-pyrrolidone
B: N-methyl-ε-caprolactam
C: N',N'-dimethylethylene urea

EXAMPLES 4 AND 5 AND COMPARATIVE EXAMPLES 1 AND 2

A rubber composition was prepared in the same manner as described in Example 1 except that N-methyl-2-pyrrolidone was used as the modifier and the amount of the liquid diene polymer rubber was changed as shown in Table 2. The properties of the vulcanizate were evaluated and the results are shown in Table 2.

TABLE 2

| Example | Comparative Example 1 | Example 4 | Example 1 | Example 5 | Comparative Example 2 |
|---|---|---|---|---|---|
| Amount of liquid diene polymer rubber | 0.1 | 3 | 10 | 50 | 120 |
| Rebound at 60° C. | 55 | 59 | 61 | 61 | 55 |
| Wet skid resistance | 57 | 62 | 62 | 62 | 60 |
| Extrusion processability | 9 | 15 | 16 | 15 | 12 |

EXAMPLES 6 AND 7

Liquid diene polymer rubbers having different molecular weights were prepared in the same manner as described in Examples 1 through 3 except that the amount of n-butyl lithium (dissolved in n-hexane) was changed to 12 millimoles in Example 6 and 1.4 millimoles in Example 7. All of the thus-prepared polymer rubbers were liquid at room temperature. These diene polymer rubbers were evaluated in the same manner as described in Examples 1 through 3, and the results are shown in Table 3.

COMPARATIVE EXAMPLE 3

A rubber composition was prepared in the same manner as described in Examples 1 through 3 except that the modifier used in Examples 1 through 3 was not used, and the rubber composition was evaluated in the same manner as described in Examples 1 through 3. The results are shown in Table 3.

COMPARATIVE EXAMPLE 4

A diene polymer rubber having an average molecular weight of 213,000 was prepared in the same manner as described in Examples 1 through 3 except that the amount of n-butyl lithium (dissolved in n-hexane) was changed to 0.9 millimole. The prepared polymer rubber was a solid exhibiting a rubbery elasticity at room temperature. The rubber composition was evaluated in the same manner as described in Examples 1 through 3 and the results are shown in Table 3.

COMPARATIVE EXAMPLE 5

A liquid diene polymer rubber having a weight average molecular weight of 4,000 was prepared in the same manner as described in Examples 1 through 3 except that the amount of n-butyl lithium (dissolved in n-hexane) was changed to 45 millimoles. The rubber composition was evaluated in the same manner as described in Examples 1 through 3 and the results are shown in Table 3.

TABLE 3

| Example No. | Example 6 | Example 7 | Comparative Example 3 | Comparative Example 4 | Comparative Example 5 |
|---|---|---|---|---|---|
| Modifier | B | B | Not added | B | B |
| Weight average molecular weight of liquid diene polymer rubber | 14,600 | 127,000 | 6,000 | 213,000 | 4,000 |
| Amount of liquid diene polymer rubber | 10 | 10 | 10 | 10 | 10 |
| Rebound at 60° C. | 60 | 61 | 55 | 62 | 56 |
| Wet skid | 62 | 61 | 58 | 63 | 62 |

TABLE 3-continued

| Example No. | Example 6 | Example 7 | Comparative Example 3 | Comparative Example 4 | Comparative Example 5 |
|---|---|---|---|---|---|
| resistance | | | | | |
| Extrusion processability | 16 | 16 | 12 | 10 | 15 |

Note:
Modifier B is the same as in Table 1

As is apparent from the foregoing description, the dipersibility of carbon black in the rubber composition of the present invention is improved and the processability of the rubber composition is enhanced by the addition of the specified processing aid. It is surprising that, although a liquid polymer is used as the processing aid, deterioration of the physical properties, such as rebound, of the vulcanizate of the rubber composition, which is readily caused when a terminal-modified liquid polymer is added, is not caused at all. Moreover, use of a process oil can be omitted or the amount of the process oil can be reduced, and consequently, further improvement of the physical properties of the vulcanizate can be expected.

Since the vulcanizate of the rubber composition of the present invention has improved physical properties including an improved rebound, the rubber composition is especially valuable for a tread or carcass of an automobile tire or twowheeled vehicle, although the use thereof is not limited.

We claim:

1. A rubber composition comprising a rubbery polymer, carbon black and a processing aid, wherein the processing aid is a liquid diene polymer having a weight average molecular weight of about 5,000 to 140,000 and having an atomic group having a bond represented by the formula:

which is bonded to the terminal of the polymer chain, and the amount of the liquid diene polymer is 1 to 100 parts by weight per 100 parts by weight of the rubbery polymer.

2. A rubber composition according to claim 1, wherein the liquid diene polymer is a reaction product of an anionic living liquid diene polymer with a compound having in the molecule a bond represented by the formula:

in which M represents an oxygen or sulfur atom.

3. A rubber composition according to claim 1, wherein the rubbery polymer is a rubbery polymer capable of being reinforced with carbon black.

* * * * *